(12) United States Patent
Kawasaki et al.

(10) Patent No.: US 11,355,794 B2
(45) Date of Patent: Jun. 7, 2022

(54) SECONDARY BATTERY MODULE

(71) Applicants: Sanyo Chemical Industries, Ltd., Kyoto (JP); APB Corporation, Tokyo (JP)

(72) Inventors: Yohji Kawasaki, Kyoto (JP); Yusuke Mizuno, Kyoto (JP); Hideaki Horie, Tokyo (JP)

(73) Assignees: SANYO CHEMICAL INDUSTRIES, LTD., Kyoto (JP); APB CORPORATION, Tokyo (JP)

( * ) Notice: Subject to any disclaimer, the term of this patent is extended or adjusted under 35 U.S.C. 154(b) by 0 days.

(21) Appl. No.: 17/290,895

(22) PCT Filed: Sep. 4, 2020

(86) PCT No.: PCT/JP2020/033696
§ 371 (c)(1),
(2) Date: May 3, 2021

(87) PCT Pub. No.: WO2021/045222
PCT Pub. Date: Mar. 11, 2021

(65) Prior Publication Data
US 2021/0359349 A1 Nov. 18, 2021

(30) Foreign Application Priority Data
Sep. 6, 2019 (JP) .............................. JP2019-163177

(51) Int. Cl.
*H01M 10/48* (2006.01)
*H04B 10/25* (2013.01)

(52) U.S. Cl.
CPC .......... *H01M 10/488* (2013.01); *H04B 10/25* (2013.01)

(58) Field of Classification Search
CPC ............................ H01M 10/488; H04B 10/25
See application file for complete search history.

(56) References Cited

U.S. PATENT DOCUMENTS

| 2011/0025272 A1 | 2/2011 | Nagashima et al. |
| 2013/0029245 A1 | 1/2013 | Fisher et al. |
| (Continued) | | |

FOREIGN PATENT DOCUMENTS

| JP | S54-127691 A | 10/1979 |
| JP | S64-44076 A | 2/1989 |
| (Continued) | | |

*Primary Examiner* — Jimmy Vo
(74) *Attorney, Agent, or Firm* — Workman Nydegger

(57) ABSTRACT

The present disclosure provides a secondary battery module capable of optically transmitting measurement data on characteristics of cells forming a battery pack and further reducing a complicated procedure of wiring. The secondary battery module of the present disclosure includes: a battery pack in which a plurality of cell units are connected, each of the cell units including a cell and a light-emitting unit, the cell including a stacked unit and an electrolyte, the light-emitting unit being configured to measure characteristics of the cell and generate an optical signal according to the characteristics; and an optical waveguide into which an optical signal is introduced from the light-emitting unit of each of the cell units, wherein the number of optical waveguides is less than the number of optical signals, and the optical waveguide provides a common optical path through which optical signals are propagated from the light-emitting units provided in the battery pack.

4 Claims, 11 Drawing Sheets

(56) References Cited

U.S. PATENT DOCUMENTS

| | | | | |
|---|---|---|---|---|
| 2013/0316198 | A1* | 11/2013 | Bandhauer | G08C 17/02 |
| | | | | 429/50 |
| 2014/0203783 | A1* | 7/2014 | Kiesel | H02J 7/007 |
| | | | | 320/134 |
| 2015/0155605 | A1 | 6/2015 | Dvorsky et al. | |
| 2016/0097501 | A1 | 4/2016 | Yoshitani et al. | |
| 2019/0229376 | A1 | 7/2019 | Petrakivskyi et al. | |

FOREIGN PATENT DOCUMENTS

| | | |
|---|---|---|
| JP | H11-341693 A | 12/1999 |
| JP | 2011-129450 A | 6/2011 |
| JP | 2015-099711 A | 5/2015 |
| JP | 2016-110075 A | 6/2016 |
| WO | 2009/119075 A | 10/2009 |

\* cited by examiner

SECONDARY BATTERY MODULE

TECHNICAL FIELD

The present disclosure relates to a secondary battery module.

BACKGROUND ART

As a power source of an electric vehicle or hybrid electric vehicle and a power source of portable electronic equipment, a battery pack in which a plurality of lithium ion cells are stacked is used. In the case of recharging such a battery pack, it is necessary to perform charging management such that there is no overcharged cell.

As a means of recharging such a battery pack, there is known a charging device which monitors an inter-terminal voltage of each cell and performs charging control (PTL 1).

CITATION LIST

Patent Literature

PTL 1: International Laid-Open No. WO 2009/119075
PTL 2: Japanese Patent Laid-Open No. H11-341693

SUMMARY OF INVENTION

The charging device disclosed in PTL 1 is provided with a circuit for measuring an inter-terminal voltage of a cell and comprises a charging control unit which controls a power supply circuit to reduce a charging current value when an inter-terminal voltage value measured during a recharge reaches a predetermined voltage value.

In this configuration, since a lead extends from each cell to measure the inter-terminal voltage, wiring connection is complicated, the number of components is large, and there is a risk of a short circuit between the cells caused by electrical wiring.

To solve the above problems, there is an idea of using an optical fiber to transfer an optical signal. For example, PTL 2 discloses that an overcharge heating circuit including a light-emitting diode is connected in parallel to both ends of a battery module including cells connected in series such that on the occurrence of overcharging, light emission from the light-emitting diode is transmitted to a light-receiving diode through a common optical fiber.

However, according to the technique disclosed in PTL 2, although the risk of a short circuit between the cells can be avoided by means of the optical fiber, it is necessary to make wiring connection like the electrical wiring stated above and to dispose bent portions of the optical fiber close to a plurality of light-emitting diodes (FIG. 5 of PTL 2, etc.). The result is that it takes time and effort to carry out wiring and the problems stated above are still not overcome.

The present disclosure has been accomplished in consideration of the above problems and aims to provide a secondary battery module capable of optically transmitting measurement data on characteristics of cells forming a battery pack and further reducing a complicated procedure of wiring.

The secondary battery module of the present disclosure comprises: a battery pack in which a plurality of cell units are connected, each of the cell units comprising a cell and a light-emitting unit, the cell including a stacked unit and an electrolyte, the stacked unit having a set of a positive material, an ion-permeable material or ion-conductive material, and a negative material which are stacked sequentially, the light-emitting unit being configured to measure characteristics of the cell and generate an optical signal according to the characteristics; and an optical waveguide which is provided on an outer surface of the battery pack and into which an optical signal is introduced from the light-emitting unit of each of the cell units, and the secondary battery module is characterized in that the number of optical waveguides is less than the number of optical signals, and the optical waveguide provides a common optical path through which optical signals are propagated from the light-emitting units provided in the battery pack.

According to the present disclosure, there can be provided a secondary battery module capable of optically transmitting measurement data on characteristics of cells forming a battery pack and further reducing a complicated procedure of wiring.

DESCRIPTION OF EMBODIMENTS

Embodiments of the present invention will be hereinafter described in detail.

It should be noted that a lithium ion battery described herein is a concept including a lithium ion secondary battery.

A lithium ion battery module according to an embodiment comprises:

a battery pack in which a plurality of cell units are connected, each of the cell units comprising a cell and a light-emitting unit, the cell including a stacked unit and an electrolyte solution, the stacked unit being formed by a set of a positive current collector, a positive active material layer, a separator, a negative active material layer, and a negative current collector which are stacked sequentially, the light-emitting unit being configured to measure characteristics of the cell and generate an optical signal according to the characteristics;

an optical waveguide which is provided on an outer surface of the battery pack and into which an optical signal is introduced from the light-emitting unit of each of the cell units;

an exterior body accommodating the battery pack and the optical waveguide, one end of the optical waveguide being out of the exterior body; and a light-receiving unit configured to receive an optical signal derived from the one end of the optical waveguide out of the exterior body, and the light-receiving unit and the battery pack are electrically insulated from each other.

The lithium ion battery module of the embodiment is characterized by using an optical signal as an analog signal to transfer information on the cells forming the battery pack by comprising the configuration described above.

The constituent elements of the lithium ion battery module of the embodiment include the battery pack, the optical waveguide, and the exterior body.

The battery pack is formed by connecting the cell units, each cell unit comprising the cell and the light-emitting unit. The cell units are preferably connected in series in the battery pack. The lithium ion battery is classified into a battery with a relatively large capacity. The battery pack is formed by connecting cell units including lithium ion batteries in series, thereby implementing a large-capacity lithium ion battery module according to the number of cell units.

First, the cell unit comprising the cell and the light-emitting unit will be described.

Figure 1:
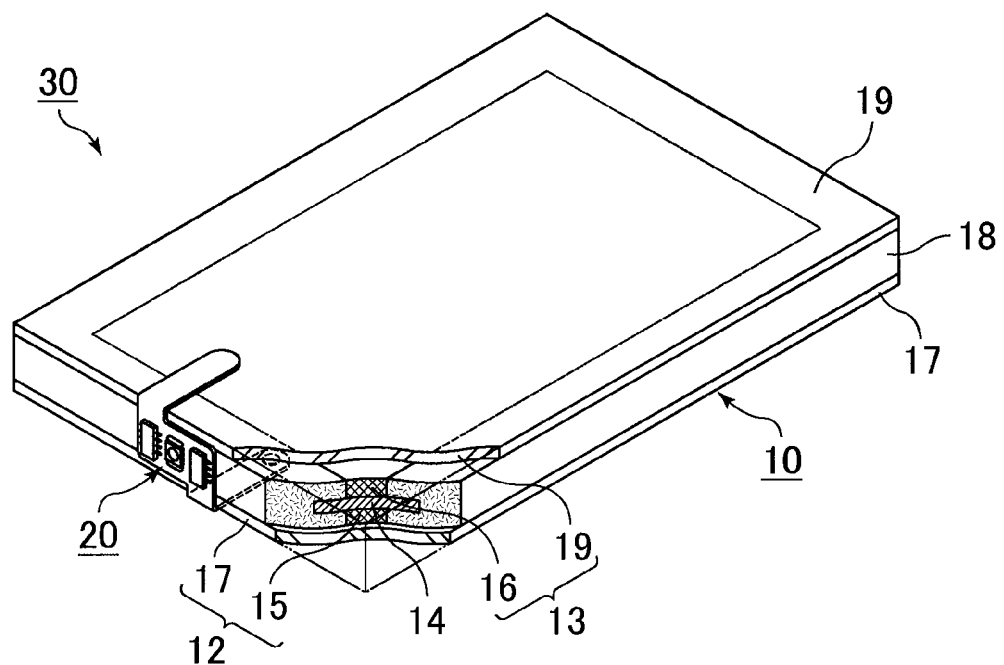
FIG. 1 is a partially cutaway perspective view schematically showing an example of a cell unit.

FIG. 1 is a partially cutaway perspective view schematically showing an example of the cell unit.

FIG. 1 shows a cell unit 30 comprising a cell 10, which is a lithium ion battery, and a light-emitting unit 20.

The cell 10 is formed into a substantially-rectangular and planar shape as a whole by stacking a positive electrode 12, which is obtained by forming a positive active material layer 15 on the surface of a substantially-rectangular and planar positive current collector 17, and a negative electrode 13, which is obtained by forming a negative active material layer 16 on the surface of a similarly substantially-rectangular and planar negative current collector 19, via a similarly substantially-planar separator 4. The positive electrode and the negative electrode function as a positive electrode and a negative electrode of the lithium ion battery.

The cell 10 has an annular frame member 18 disposed between the positive current collector 17 and the negative current collector 19 to fix the edge portion of the separator 14 between the positive current collector 17 and the negative current collector 19 and seal the positive active material layer 15, the separator 14, and the negative active material layer 16.

The positive current collector 17 and the negative current collector 19 are positioned by the frame member 18 so as to be opposed at a predetermined interval. The separator 14, the positive active material layer 15, and the negative active material layer 16 are also positioned by the frame member 18 so as to be opposed at a predetermined interval.

An interval between the positive current collector 17 and the separator 14 and an interval between the negative current collector 19 and the separator 14 are adjusted according to the capacity of the lithium ion battery. The positional relationship among the positive current collector 17, the negative current collector 19, and the separator 14 is determined so as to obtain necessary intervals.

A preferred aspect of each constituent element of the cell will be hereinafter described.

The positive active material layer includes a positive active material.

Examples of the positive active material include multiple oxides of lithium and transition metal (multiple oxides with a single transition metal [$LiCoO_2$, $LiNiO_2$, $LiAlMnO_4$, $LiMnO_2$, $LiMn2O_4$, etc.], multiple oxides with two transition metal elements [e.g., $LiFeMnO_4$, $LiNi_{1-x}Co_xO_2$, $LiMn_{1-y}Co_yO_2$, $LiNi_{1/3}Co_{1/3}Al_{1/3}O_2$, and $LiNi_{0.8}Co_{0.15}Al_{0.05}O_2$], multiple oxides with three or more metal elements [e.g., $LiM_aM'_bM''_cO_2$ (where M, M', and M'' are different transition metal elements and satisfy a+b+c=1; e.g., $LiNi_{1/3}Mn_{1/3}CO_{1/3}O_2)$], etc.), lithium-containing transition metal phosphates (e.g., $LiFePO_4$, $LiCoPO_4$, $LiMnPO_4$, and $LiNiPO_4$), transition metal oxides (e.g., $MnO_2$ and $V_2O_5$), transition metal sulfides (e.g., $MoS_2$ and $TiS_2$), and conductive polymers (e.g., polyaniline, polypyrrole, polythiophene, polyacetylene, poly-p-phenylene, and polyvinylcarbazole), where two or more types of them may be used together.

Some of the transition metal sites of the lithium-containing transition metal phosphates may be substituted by another transition metal.

The positive active material is preferably a coated positive active material coated with a conductive agent and a coating resin.

If the exterior of the positive active material is coated with a coating resin, a change in volume of an electrode is reduced and the expansion of the electrode can be suppressed.

Examples of the conductive agent include metal-based conductive agents (aluminum, stainless steel [SUS], silver, gold, copper, titanium, etc.), carbon-based conductive agents (graphite and carbon black [acetylene black, ketjen black, furnace black, channel black, thermal lamp black, etc.] etc.), and mixtures thereof.

Among these conductive agent, a single kind may be used alone and two or more kinds may be used together. Further, they may be used as their alloys or metal oxides.

In particular, from the viewpoint of electrical stability, aluminum, stainless steel, silver, gold, copper, titanium, carbon-based conductive agents and mixtures thereof are more preferable, silver, gold, aluminum, stainless steel and carbon-based conductive agents are yet more preferable, and carbon-based conductive agents are especially preferable.

These conductive agents may be ones obtained by coating the periphery of a particulate ceramic material or resin material with a conductive material (preferably metal-based ones among the conductive agents listed above) by means of plating or the like.

The shape (form) of the conductive agent is not limited to a particulate form and may be a form other than the particulate form such as a form actually used as a so-called filler conductive agent such as a carbon nanofiber or carbon nanotube.

The ratio between the coating resin and the conductive agent is not particularly limited. However, from the viewpoint of the internal resistance of the battery and the like, the weight ratio between the coating resin (weight of resin solids) and the conductive agent is preferably from 1:0.01 to 1:50, and more preferably from 1:0.2 to 1:3.0.

As the coating resin, ones disclosed as nonaqueous secondary battery active material coating resins in Japanese Patent Laid-Open No. 2017-054703 can be suitably used.

Further, the positive active material layer may include a conductive agent other than the conductive agent included in the coated positive active material.

As the conductive agent, the same ones as those included in the coated positive active material described above can be suitably used.

It is preferable that the positive active material layer include positive active materials and be an unbound body not including a binding agent which binds the positive active materials together.

The unbound body used here means that the positions of positive active materials are not fixed by a binding agent (also referred to as a binder), the positive active materials are not fixed irreversibly to each other, and the positive active materials and the current collector are not fixed irreversibly to each other.

The positive active material layer may include an adhesive resin.

As the adhesive resin, for example, one obtained by mixing a small amount of organic solvent with a nonaqueous secondary battery active material coating resin disclosed in Japanese Patent Laid-Open No. 2017-054703 and adjusting its glass transition temperature below the room temperature and one disclosed as an adhesive in Japanese Patent Laid-Open No. H10-255805 can be suitably used.

The adhesive resin means a resin which does not solidify and has adhesion (the property of adhering by applying a slight pressure without the use of water, solvent, or heat) even if solvent components are volatilized and dried. In contrast, an electrode binder of a solvent drying type used as the binding agent indicates one drying and solidifying by volatilizing solvent components to strongly bond and fix active materials.

Accordingly, an electrode binder (binding agent) of a solvent drying type is a material different from the adhesive resin.

The thickness of the positive active material layer is not particularly limited. However, from the viewpoint of battery performance, the thickness is preferably from 150 to 600 μm and more preferably from 200 to 450 μm.

The negative active material layer includes a negative active material.

As the negative active material, a well-known negative active material for a lithium ion battery can be used and examples thereof include carbon-based materials (graphite, non-graphitizable carbon, amorphous carbon, resin calcined material [e.g., calcined and carbonized phenolic resin and furan resin], cokes [e.g., pitch coke, needle coke, and petroleum coke], carbon fibers, etc.), silicon-based materials (silicon, silicon oxide [SiOx], silicon-carbon composites [carbon particles with surfaces coated with silicon and/or silicon carbide, silicon particles or silicon oxide particles with surfaces coated with carbon and/or silicon carbide, silicon carbide, etc.], silicon alloys [silicon-aluminum alloy, silicon-lithium alloy, silicon-nickel alloy, silicon-iron alloy, silicon-titanium alloy, silicon-manganese alloy, silicon-copper alloy, silicon-tin alloy, etc.] etc.), conductive polymers (e.g., polyacetylene and polypyrrole), metals (tin, aluminum, zirconium, titanium, etc.), metal oxides (titanium oxide, lithium-titanium oxide, etc.), metal alloys (e.g., lithium-tin alloy, lithium-aluminum alloy, and lithium-aluminum-manganese alloy), and mixtures of them and carbon-based materials.

Further, the negative active material may be a coated negative active material coated with a conductive agent and a coating resin like the coated positive active material described above.

As the conductive agent and the coating resin, the same conductive agent and coating resin as those used for the coated positive active material described above can be suitably used.

Further, the negative active material layer may include a conductive agent other than the conductive agent included in the coated negative active material. As the conductive agent, the same conductive agent as that included in the coated positive active material described above can be suitably used.

The negative active material layer is preferably an unbound body not including a binding agent which binds negative active materials together like the positive active material layer. Further, the negative active material layer may include an adhesive resin like the positive active material layer.

The thickness of the negative active material layer is not particularly limited. However, from the viewpoint of battery performance, the thickness is preferably from 150 to 600 μm and more preferably from 200 to 450 μm.

Examples of the material for the positive current collector and the negative current collector (hereinafter collectively referred to as current collectors) include metal materials such as copper, aluminum, titanium, stainless steel, nickel, and alloys thereof, calcined carbon, conductive polymeric material, and conductive glass.

Among these materials, from the viewpoint of weight reduction, corrosion resistance, and high conductivity, it is preferable to use aluminum as the positive current collector and copper as the negative current collector.

Further, the current collectors are preferably resin current collectors made of a conductive polymeric material.

The shape of the current collector is not particularly limited and may be a sheet-like current collector made of the material stated above or a deposited layer made from fine particles of the material stated above.

The thickness of the current collector is not particularly limited but is preferably from 50 to 500 μm.

As the conductive polymeric material for the resin current collector, for example, a conductive polymeric material or resin to which a conductive agent is added as necessary can be used.

As the conductive agent for the conductive polymeric material, the same conductive agent as that included in the coated positive active material described above can be suitably used.

Examples of the resin forming the conductive polymeric material include polyethylene (PE), polypropylene (PP), polymethylpentene (PMP), polycycloolefin (PCO), polyethylene terephthalate (PET), polyether nitrile (PEN), polytetrafluoroethylene (PTFE), styrene-butadiene rubber (SBR), polyacrylonitrile (PAN), polymethylacrylate (PMA), polymethylmethacrylate (PMMA), polyvinylidene fluoride (PVdF), epoxy resin, silicone resin, and a mixture thereof.

From the viewpoint of electrical stability, polyethylene (PE), polypropylene (PP), polymethylpentene (PMP), and polycycloolefin (PCO) are preferable, and polyethylene (PE), polypropylene (PP), and polymethylpentene (PMP) are more preferable.

Examples of the separator include a well-known separator for a lithium ion battery such as a porous film made of polyethylene or polypropylene, a laminated film of a porous polyethylene film and a porous polypropylene film, a nonwoven fabric made of synthetic fibers (polyester fibers, aramid fibers, etc.), glass fibers, etc., and those having a surface with fine ceramic particles of silica, alumina, titania, etc. adhering thereto.

The positive active material layer and the negative active material layer include an electrolyte solution.

As the electrolyte solution, a well-known electrolyte solution for use in manufacture of a well-known lithium ion battery containing an electrolyte and a nonaqueous solvent can be used.

As the electrolyte, one used for a well-known electrolyte solution or the like can be used and examples thereof include inorganic acid lithium salts such as $LiN(FSO_2)_2$, $LiPF_6$, $LiBF_4$, $LiSbF_6$, $LiAsF_6$, and $LiClO_4$ and organic acid lithium salts such as $LiN(CF_3SO_2)_2$, $LiN(C_2F_5SO_2)_2$, and $LiC(CF_3SO_2)_3$. Among them, from the viewpoint of battery output and charge/discharge cycle characteristics, it is preferable to use imide-based electrolytes ($LiN(FSO_2)_2$, $LiN(CF_3SO_2)_2$, $LiN(C_2F_5SO_2)_2$, etc.) and $LiPF_6$.

As the nonaqueous solvent, one used for a well-known electrolyte solution or the like can be used. For example, a lactone compound, cyclic or chain carbonate ester, chain carboxylic acid ester, cyclic or chain ether, phosphoric ester, nitrile compound, amide compound, sulfone, sulfolane, and mixtures thereof can be used.

The electrolyte concentration of the electrolyte solution is preferably from 1 to 5 mol/L, more preferably from 1.5 to 4 mol/L, and yet more preferably from 2 to 3 mol/L.

If the electrolyte concentration of the electrolyte solution is less than 1 mol/L, sufficient input/output characteristics of the battery cannot be obtained in some cases. If the electrolyte concentration of the electrolyte solution exceeds 5 mol/L, the electrolyte is often precipitated.

The electrolyte concentration of the electrolyte solution can be checked by extracting an electrolyte solution forming an electrode for a lithium ion battery or a lithium ion battery without using a solvent or the like and measuring its concentration.

Next, the light-emitting unit will be described.

Figure 2:
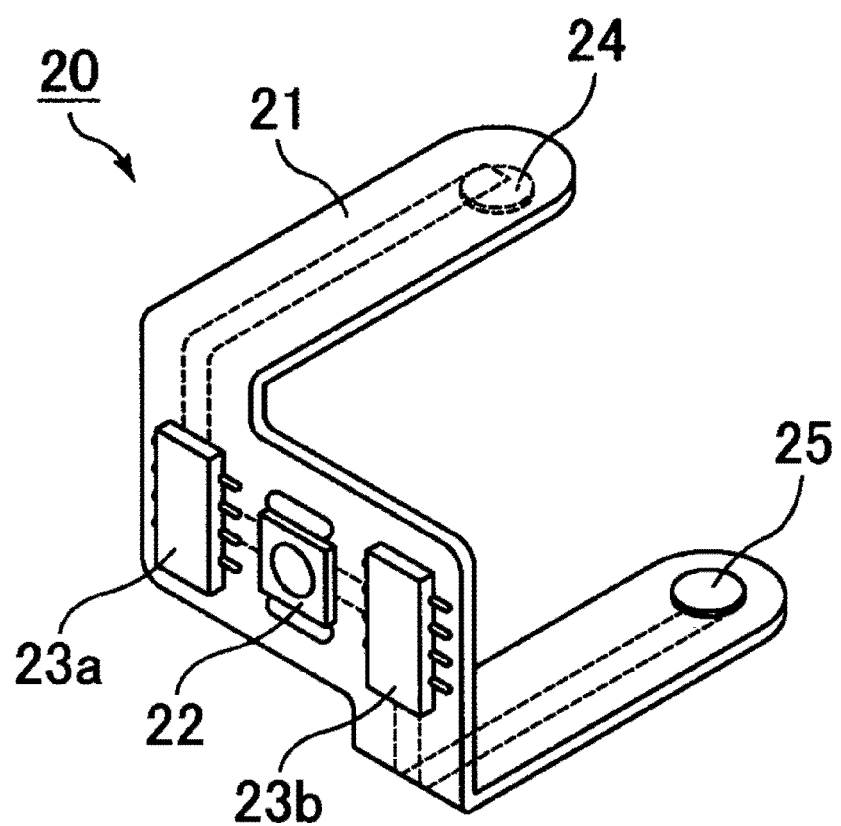
FIG. 2 is a perspective view schematically showing an example of a light-emitting unit.

FIG. 2 is a perspective view schematically showing an example of the light-emitting unit.

The light-emitting unit 20 shown in FIG. 2 comprises a wiring board 21 having wiring therein or on its surface and a light-emitting element 22 and control elements 23a and 23b mounted on the wiring board 21. The ends of the wiring board are provided with measuring terminals 24 and 25. The measuring terminals 24 and 25 are provided at such positions that in a case where they are connected to a cell, one measuring terminal is in contact with the positive current collector and the other measuring terminal is in contact with the negative current collector. In this case, the measuring terminals 24 and 25 function as voltage measuring terminals which measure a voltage between the positive current collector and the negative current collector of the cell.

Further, a measuring terminal (not shown) is also provided on a surface of the wiring board 21 on the back of the light-emitting element 22. This measuring terminal (not shown) can be used as a temperature measuring terminal for measuring the temperature of a cell.

The light-emitting unit 20 measures characteristics of a cell and generates an optical signal according to the characteristics.

The measuring terminals 24 and 25 and temperature measuring terminal (not shown) are electrically connected to the control elements 23a and 23b and the control elements 23a and 23b are electrically connected to the light-emitting element 22.

The control elements control the light-emitting element to emit light in a predetermined optical signal pattern based on information indicating the characteristics of a cell measured by the measuring terminals. The information measured by the measuring terminals is preferably the voltage and temperature of a cell.

The light-emitting element 22 emits light in a predetermined optical signal pattern based on control signals generated by the control elements 23a and 23b and generates an optical signal.

As the wiring board forming the light-emitting unit, a rigid board or a flexible board can be used. In the case of the shape of the wiring board as shown in FIG. 2, a flexible board is preferable.

As the control element, any semiconductor element such as an IC or LSI can be used. Although FIG. 2 shows an example of mounting two control elements, the number of control elements is not limited and may be one or three or more.

As the light-emitting element, an element capable of converting an electrical signal into an optical signal such as an LED element or organic EL element can be used, and an LED element is preferable. For example, the light-emitting element can be one or more of a light-emitting element with a center wavelength from 700 to 800 nm, a light-emitting element with a center wavelength from 850 to 950 nm, and a light-emitting element with a center wavelength from 1000 to 1400 nm. The light-emitting unit may be configured by combining a light-emitting element with a center wavelength from 700 to 800 nm with a light-emitting element with a center wavelength from 850 to 950 nm or by combining a light-emitting element with a center wavelength from 850 to 950 nm with a light-emitting element with a center wavelength from 1000 to 1400 nm. It is only necessary to select the light-emitting element in consideration of the peak of the absorption spectrum of a material for a waveguide.

It should be noted that the wiring board is not essential for the light-emitting unit and the light-emitting unit may be configured by connecting the control elements to the light-emitting element without interposing a board.

The light-emitting unit is preferably electrically connected to the negative current collector and the positive current collector of the cell so as to receive power supply from the lithium ion battery.

If the light-emitting unit is electrically connected to the negative current collector and the positive current collector, the light-emitting element can emit light by receiving power supply from the lithium ion battery. Since there is no need to provide a power source or wiring for causing the light-emitting element to emit light, the configuration can be simplified.

Although FIG. 2 does not show an electrode for receiving power supply, it is preferable to provide the light-emitting unit with an electrode different from the measuring terminals.

In a case where the light-emitting unit is electrically connected to the negative current collector and the positive current collector, it is preferable that the negative current collector and the positive current collector be resin current collectors and the negative current collector and the positive current collector be directly joined and electrically connected to electrodes of the light-emitting unit.

In the case of using resin current collectors, the resin current collectors are brought into contact with the electrodes of the light-emitting unit and the resin current collectors are heated to soften the resin, whereby the resin current collectors can be directly joined to the light-emitting unit. Alternatively, electrical connection can be made by interposing another conductive bonding agent such as solder between the current collectors and the light-emitting unit.

Since each cell equipped with the light-emitting element and the control elements as stated above has such a thickness (length in the stacking direction) and size of the stacked surface (lengths in the longitudinal and lateral directions) as to dispose the light-emitting element and the control elements, the shape of the cell unit is relatively large and thick. Thus, the shape of a battery pack in which a plurality of cell units are connected can also be relatively large.

Next, among the constituent elements of the lithium ion battery module, the battery pack, the optical waveguide, and the exterior body will be described.

Figure 3:
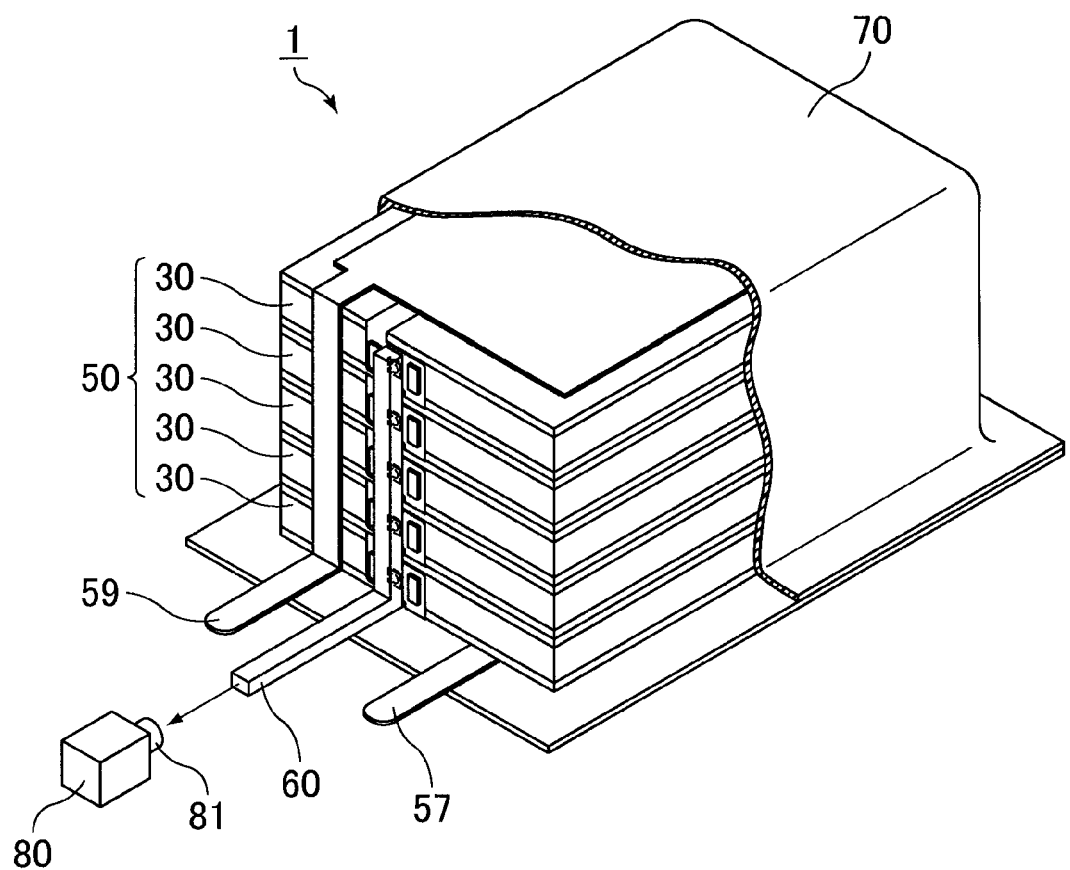
FIG. 3 is a partially cutaway perspective view schematically showing an example of a lithium ion battery module.

FIG. 3 is a partially cutaway perspective view schematically showing an example of the lithium ion battery module.

In FIG. 3, the exterior body is partially removed to illustrate the configuration of the battery pack.

FIG. 3 shows a lithium ion battery module 1.

A battery pack 50 forming the lithium ion battery module 1 is obtained by connecting a plurality of cell units 30. FIG. 3 shows the battery pack 50 in which five cell units 30 shown in FIG. 1 are stacked. In the battery pack 50, the cells 10 are stacked such that the top surface of the negative current collector 19 and the bottom surface of the positive current collector 17 of adjacent cells 10 are adjacent to each other.

In this case, the plurality of cell units 30 are connected in series.

On the outer surface (side surface) of the battery pack 50, the light-emitting units 20 of the respective cell units 30 are placed in a line.

The outer surface of the battery pack 50 (side surface of the battery pack) is also provided with an optical waveguide 60. An optical signal from the light-emitting unit 20 of each cell unit 30 is introduced into the optical waveguide 60.

It is preferable that one optical waveguide be provided for one battery pack. It is also preferable that one optical waveguide be formed by a bundle of optical fibers. By arranging a bundle of optical fibers on the outer surface (side surface) of the battery pack 50, an optical signal is introduced from a position (surface) facing the light-emitting unit 20 of each cell unit 30 into the optical waveguide 60, which avoids the necessity to dispose bent portions of the optical fibers close to the light-emitting units 20. It is preferable that the number of optical waveguides be less than the number of optical signals (the number of light-emitting units 20 in the battery pack 50) and the optical waveguide be configured to provide a common optical path through which optical signals are propagated from the light-emitting units 20 of the battery pack 50.

The battery pack 50 and the optical waveguide 60 are accommodated in an exterior body 70.

As the exterior body, a metal can case, a polymer-metal composite film, and the like can be used.

One end of the optical waveguide 60 is drawn out of the exterior body 70 and an optical signal is derived from the one end of the optical waveguide drawn out of the exterior body 70.

On the uppermost negative current collector 19 of the battery pack 50 is provided a conductive sheet. A part of the conductive sheet is extracted from the exterior body 70 and made into extracted wiring 59.

On the lowermost positive current collector 17 of the battery pack 50 is also provided a conductive sheet. A part of the conductive sheet is extracted from the exterior body 70 and made into extracted wiring 57.

The material for the conductive sheets is not particularly limited as long as it is a conductive material. Metal materials such as copper, aluminum, titanium, stainless steel, nickel, and alloys thereof, and the materials described above as the resin current collector can be appropriately selected and used.

An optical signal derived from the one end of the optical waveguide drawn out of the exterior body is received by a light-receiving unit 80. The light-receiving unit 80 comprises a light-receiving element 81 and can obtain an electrical signal indicating the internal condition of the cell included in the battery pack by reversely converting the optical signal into an electrical signal using the light-receiving element 81.

As the light-receiving element, an LED element, a phototransistor, and the like can be used, and an LED element is preferable.

The light-receiving unit may be formed by mounting a light-receiving element on a wiring board. Alternatively, a light-receiving element itself may be treated as the light-receiving unit.

The light-receiving unit and the optical waveguide are not electrically connected to each other and information is transmitted between the light-receiving unit and the optical waveguide by an optical signal.

The light-receiving unit and the optical waveguide being not electrically connected to each other means the light-receiving unit and the battery pack being electrically insulated from each other.

In the present embodiment, an example of the battery pack 50 in which five cell units 30 are stacked is described. However, a large-capacity battery module can be configured by the use of the battery pack 50 in which twenty or more cell units 30 are stacked. In this case, optical signals from the twenty or more light-emitting units provided in the battery pack are introduced into the optical waveguide 60, propagated through the common optical path provided by the optical waveguide 60, derived from the one end of the optical waveguide 60, and received by the light-receiving unit 80.

Figure 4:
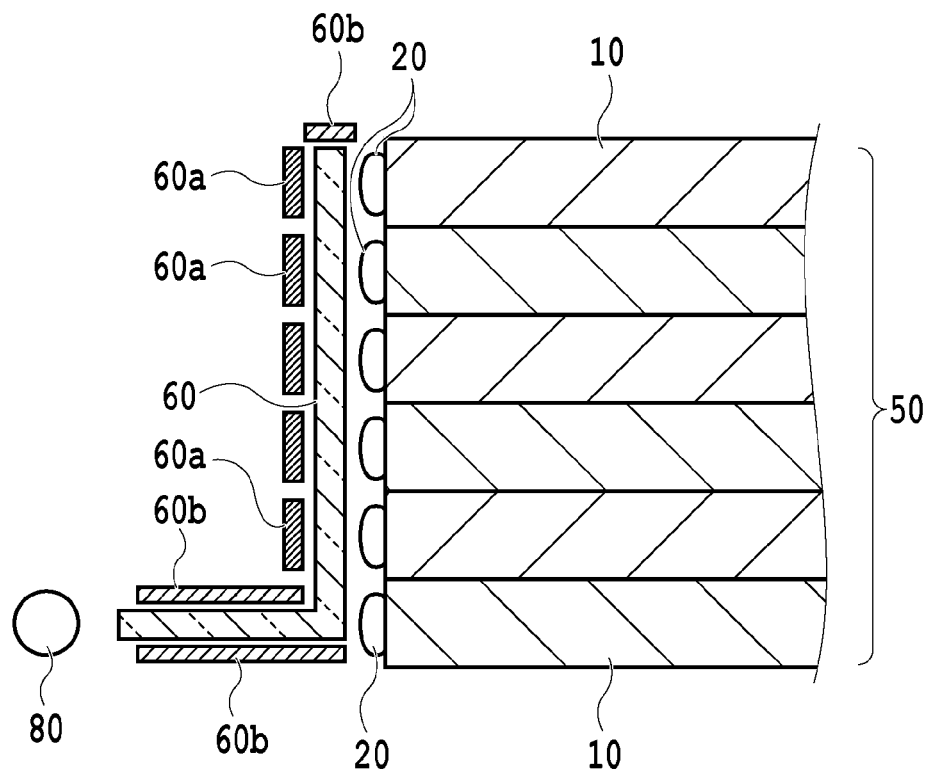
FIG. 4 is a diagram showing a schematic cross-sectional structure of the lithium ion battery shown in FIG. 3.

FIG. 4 is a diagram showing a schematic cross-sectional structure of the lithium ion battery module shown in FIG. 3. As shown in FIG. 4, the optical waveguide 60 extending in the stacking direction of the cells is disposed adjacent or close to the light-emitting surfaces of the light-emitting units 20. The optical waveguide 60 can be formed by using a waveguide tube or a light guide plate, or a cured high-refractive resin. The optical waveguide 60 has a width (a length in a direction orthogonal to the stacking direction of the cells, or a length in a direction along the side of the cell on which the light-emitting unit is provided) sufficient to receive optical signals from the light-emitting units 20. The dimension of the optical waveguide 60 in the width direction is greater than the largest dimension of the light-emitting surface of the light-emitting unit 20 (a diameter in the case of a circular light-emitting surface and a diagonal line in the case of a rectangular light-emitting surface). The optical waveguide 60 is disposed so as to cover (preferably all of) the light-emitting surfaces of the light-emitting units 20 (corresponding to the stacked cells, respectively). The optical waveguide 60 is disposed so as to cover the entire light-emitting direction of the light-emitting units 20 (including a case where the direction corresponds to a direction perpendicular to the light-emitting surfaces and a case where the direction is inclined from the direction perpendicular to the light-emitting surfaces). Although the dimension of the optical waveguide 60 in the thickness direction (dimension in the stacking direction corresponding to the light-emitting unit 20 of one cell) is not particularly limited, it is preferably greater than the thickness of the cell (thickness in the stacking direction), for example.

The optical waveguide 60 is formed of a material having a refractive index higher than the refractive index of a surrounding medium (such as air). The high refractive index means a refractive index which is different from the refractive index of the surrounding medium by a value enough to trap incident light in the optical waveguide and propagate the light. For example, the optical waveguide 60 can be formed by using a high-refractive resin film or resin plate. It is preferable that the optical waveguide 60 be formed by using a resin film or resin plate which is deformable enough to form a bent portion of about 90 degrees. The deformable resin film or resin plate may be soft or hard at the ordinary temperature or room temperature. For example, the optical waveguide 60 may be configured such that only a light input portion (portion adjacent or close to the light-emitting surfaces of the light-emitting units 20) of a surface of the optical waveguide 60 facing the light-emitting surfaces of the light-emitting units 20 and a light output portion are free from a low-refractive substance (have reduced trapping ability) and a portion other than the input portion and light output portion (the back and side surfaces of the optical waveguide 60) is covered with a substance having a refractive index lower than that in a vacuum.

A resin used for the resin film or resin plate forming the optical waveguide 60 is not limited but can be an acrylic resin or the like. For example, as the resin film or resin plate, a flexible one can be selected from among high-refractive resins called optical materials. It is preferably a resin used for the resin film or resin plate forming the film optical waveguide 60 made of a material less prone to absorb a light-emitting wavelength band of the light-emitting elements. In a case where the light-emitting wavelength band of the light-emitting elements is infrared light, it is preferable to use a film with a low infrared absorption peak of 850 nm to 950 nm.

The optical waveguide 60 has a scattering finish 60a on positions on the back side corresponding to positions on the front side where optical signals are received. The scattering finish 60a is put on positions corresponding to the light-emitting surfaces of adjacent or close light-emitting units 20. For example, the scattering finish 60a can be a concavo-convex processing. A part of an optical signal made incident on the optical waveguide 60 and scattered by the scattering finish 60a is propagated toward the light output portion. The scattering finish 60a forms a light reflection portion.

The optical waveguide 60 has a reflective finish 60b on a bent portion, whereby an optical signal scattered by the bent portion can be reflected toward the light output portion. The reflective finish 60b is put on an end of the optical waveguide 60 opposite to the end to be the light output portion as well as the bent portion, whereby light scattered away from the light output portion by the concavo-convex processing can be reflected toward the light output portion. The bent portion of the optical waveguide 60 is a portion between a portion adjacent or close to the battery pack 50 and the light output portion located at a portion away from the battery pack, and is also referred to as an extended portion.

In the lithium ion battery module of the present embodiment, the advantageous result achieved by electrically insulating the light-receiving unit and the battery pack from each other will be described.

Figure 5:
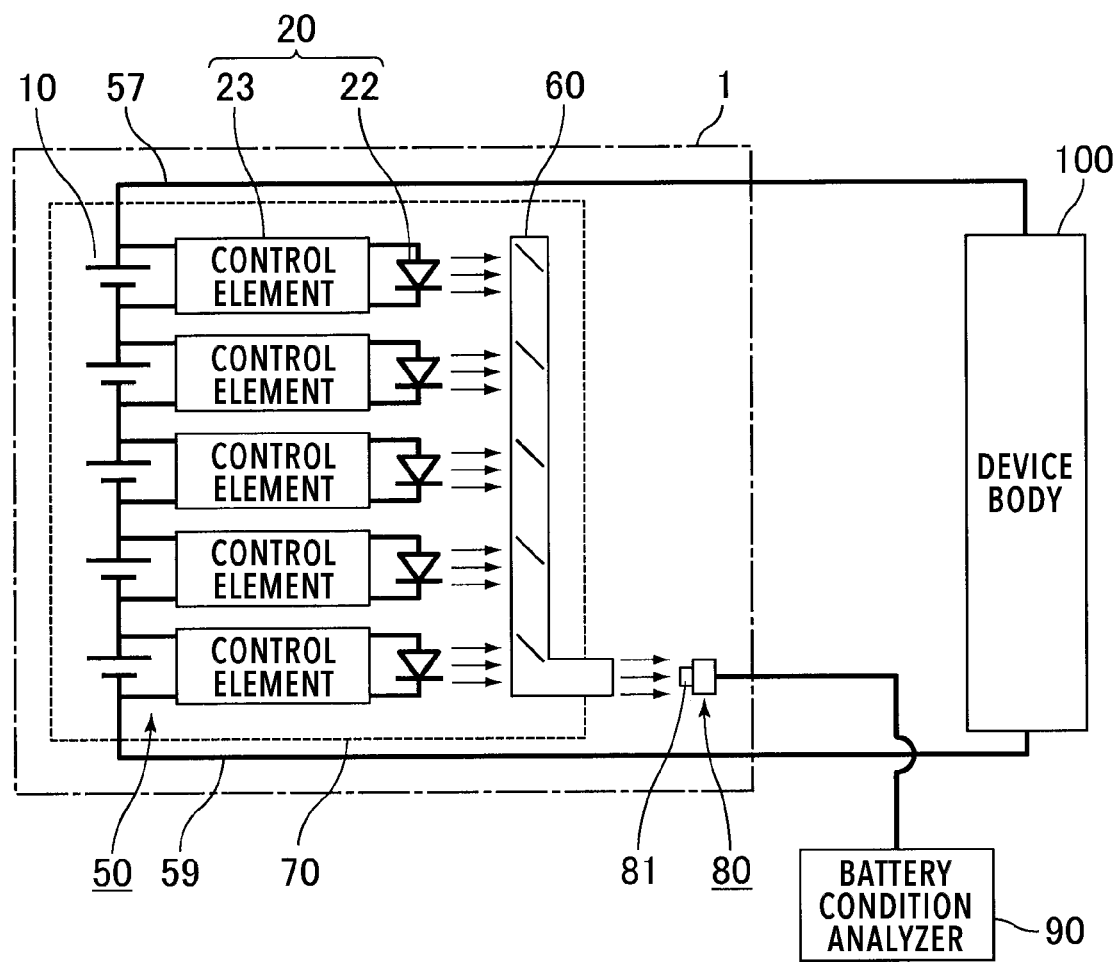
FIG. 5 is a block diagram schematically showing a circuit configuration of the lithium ion battery module inclusive of peripheral members.

FIG. 5 is a block diagram schematically showing a circuit configuration of the lithium ion battery module inclusive of peripheral members.

In FIG. 5, an area of the exterior body 70 accommodating the battery pack 50 is shown by a dashed line surrounding the battery pack 50 and the optical waveguide 60. One end of the optical waveguide 60 is out of the dashed line, which shows that the end is out of the exterior body 70.

The extracted wiring 57 and the extracted wiring 59 are also drawn out of the exterior body 70.

The optical waveguide 60 drawn out of the exterior body 70 faces the light-receiving element 81 of the light-receiving unit 80 such that the light-receiving element can receive an optical signal derived from the one end of the optical waveguide.

The light-receiving unit 80 is connected to a battery condition analyzer 90. The battery condition analyzer analyzes optical signals to analyze the characteristics of the cells included in the battery pack.

In FIG. 5, an area of the lithium ion battery module 1 including the exterior body 70 and the light-receiving unit 80 is shown by a dash-dotted line.

If the light-receiving unit and the battery pack are electrically insulated from each other, a large current that flows on the occurrence of a short at any position in the battery pack is not transferred to the light-receiving units of the cells.

Further, the large current is also not transferred to the battery condition analyzer (data processing unit) electrically connected to the light-receiving units.

That is, since there is no need to provide a protection mechanism based on the assumption that a large current flows through the light-receiving units and the battery condition analyzer, the lithium ion battery module can have such a configuration that a portion which processes measurement data on the characteristics of the cells is not affected by the occurrence of a large current in the battery pack.

The extracted wiring 57 and the extracted wiring 59 are connected to a device body 100. The device body 100 performs device operation using the battery pack 50 as a power supply.

Next, optical signal patterns according to the characteristics of the cells will be described with reference to FIG. 5, FIG. 6A (a), FIG. 6A (b), FIG. 6A (c), FIG. 6A (d), FIG. 6A (e), FIG. 6A (f), FIG. 7 (a), FIG. 7 (b), and FIG. 7 (c).

To obtain these optical signal patterns, the light-emitting unit is provided with voltage measuring terminals which measure a voltage between the positive current collector and the negative current collector of the cell and a temperature measuring terminal which measures the temperature of the cell, and is further provided with control elements which control the light-emitting element to emit light in a predetermined optical signal pattern according to the voltage measured by the voltage measuring terminals and the temperature measured by the temperature measuring terminal. The control elements control the light-emitting element to emit light in a predetermined optical signal pattern.

Figure 6A:
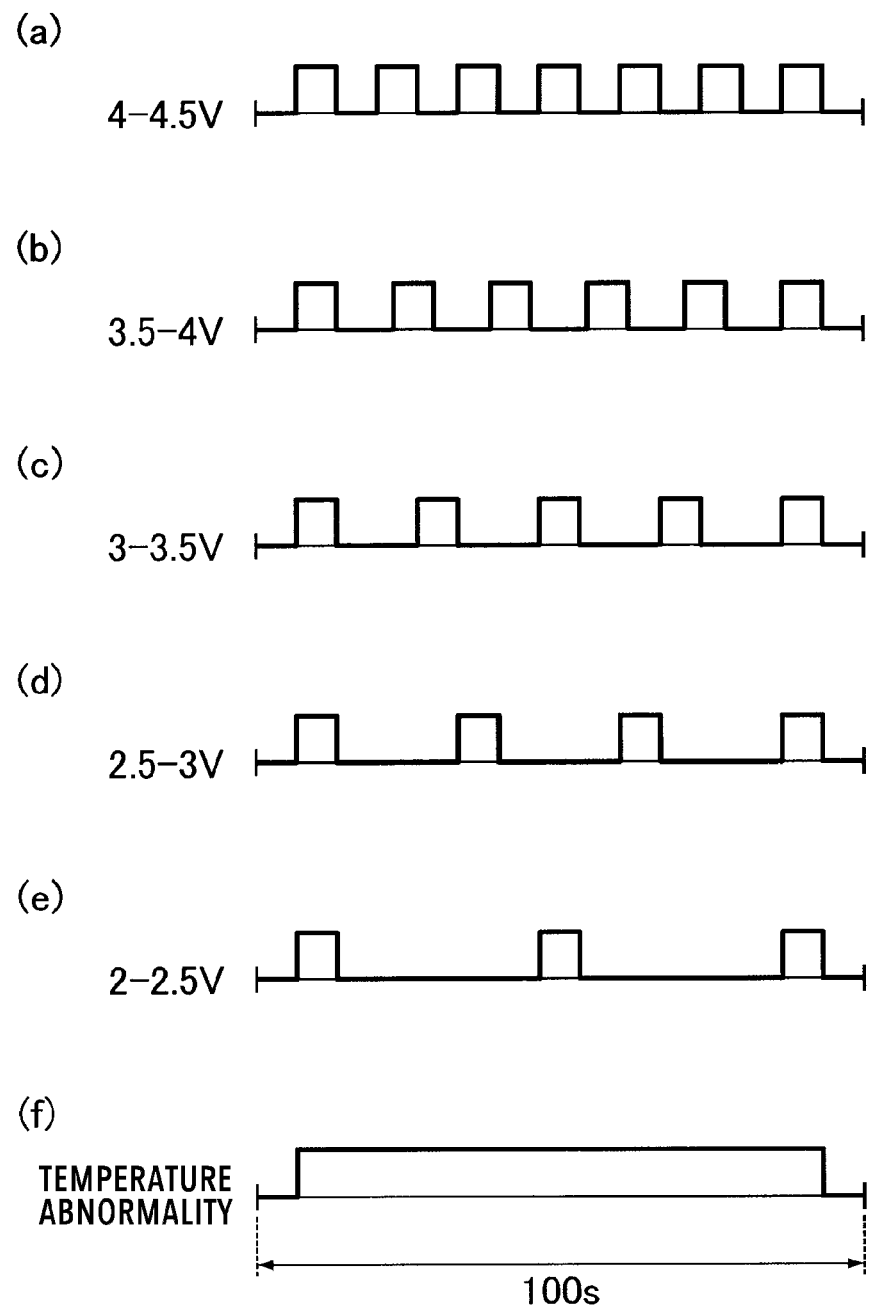
FIG. 6A (a), FIG. 6A (b), FIG. 6A (c), FIG. 6A (d), and FIG. 6A (e) are schematic diagrams showing an example of optical signal patterns for different voltages of cells and FIG. 6A (f) is a schematic diagram showing an example of an optical signal pattern in a case where a temperature of a cell is equal to or greater than a predetermined temperature.

FIG. 6A (a), FIG. 6A (b), FIG. 6A (c), FIG. 6A (d), and FIG. 6A (e) are schematic diagrams showing an example of optical signal patterns for different voltages of cells.

FIG. 6A (a), FIG. 6A (b), FIG. 6A (c), FIG. 6A (d), and FIG. 6A (e) show optical signal patterns for cell voltages of 4 to 4.5 V, 3.5 to 4 V, 3 to 3.5 V, 2.5 to 3 V, and 2 to 2.5 V, respectively. These patterns are pulse patterns in which turning on and off of the signal are repeated within a predetermined time, where the predetermined time is 100 s (100 seconds).

The predetermined time is not particularly limited and can be an arbitrary time.

In the examples, optical signal patterns are such that a single light emission time is the same and the number of repeats of turning on and off of light emission increases as the voltage rises. However, any optical signal pattern can be used as long as the voltage corresponds to the shape of the optical pattern.

For example, optical signal patterns may be such that the number of times of turning on and off of light emission is the same and a single light emission time increases as the voltage rises. Further, a single light emission time is not necessarily the same during the predetermined time.

Further, although the shape of the optical pattern differs in steps of 0.5 V voltage, the step of voltage is not particularly limited.

Figure 6B:
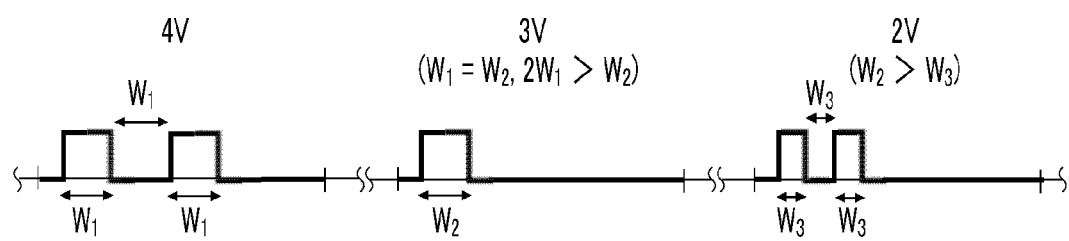
FIG. 6B is a schematic diagram showing a modified example of an optical signal pattern for different voltages of cells.

For example, differently from the aspect shown in FIG. 6A (a), FIG. 6A (b), FIG. 6A (c), FIG. 6A (d), and FIG. 6A (e) (optical patterns in which a single light emission time is the same and the number of repeats of turning on and off of light emission increases as the voltage rises), the light emission time and the number of repeats of turning on and off of light emission may differ in steps of a predetermined voltage as shown in FIG. 6B. In the example shown in FIG. 6B, an optical signal pattern is such that a light emission time ($W_2$) at 3 V voltage is shorter than a light emission time ($2W_1$) at 4 V voltage and the number of repeats of turning on and off of light emission at 3 V voltage is less than the number of repeats of turning on and off of light emission at 4 V voltage (a single light emission time at 3 V voltage may also be different from a single light emission time at 4 V voltage [$W_2 \neq W_1$]). Further, in the optical pattern, each light emission time ($W_3$) at 2 V voltage is shorter than each light emission time ($W_2$) at 3 V voltage and the number of repeats of turning on and off of light emission at 2 V voltage is greater than that at 3 V voltage.

In the present embodiment, optical signals from all the light-emitting elements (five light-emitting elements in one embodiment of the present invention) are introduced into the optical waveguide and the optical waveguide provides a common optical path for these optical signals. Thus, a crosstalk can occur in transmission through the optical waveguide. As shown in FIG. 6A (a), FIG. 6A (b), FIG. 6A (c), FIG. 6A (d), and FIG. 6A (e), if the optical patterns are such that a single light emission time is the same, a crosstalk tends to occur in transmission through the optical waveguide. However, as shown in FIG. 6B, by setting different light emission times and different numbers of repeats of turning on and off of light emission for respective predetermined voltages (or respective predetermined voltage ranges), a crosstalk can be reduced (even in the case of a crosstalk, it is easy to determine a voltage [or voltage range] corresponding to a specific optical signal out of the crosstalking optical signals) as compared with the aspect shown in FIG. 6A (a), FIG. 6A (b), FIG. 6A (c), FIG. 6A (d), and FIG. 6A (e).

FIG. 6A (f) is a schematic diagram showing an example of an optical signal pattern in a case where the temperature of a cell is equal to or greater than a predetermined temperature. In a case where the temperature of a cell is equal to or greater than the predetermined temperature, it is determined that a failure mode of temperature abnormality occurs and the optical signal pattern of "temperature abnormality" as shown in FIG. 6A (f) is generated regardless of the voltage of the cell. In a case where the temperature of a cell is less than the predetermined temperature, the temperature measured by the temperature measuring terminal is not reflected in the optical signal pattern.

FIG. 5 shows the battery pack comprising five cell units, each cell included in the battery pack being connected to the light-emitting unit.

Optical signals from the light-emitting elements of the respective light-emitting units are introduced into the optical waveguide. The optical waveguide provides a common optical path for these optical signals. Since optical signals from all the light-emitting elements (five light-emitting elements) are introduced into the optical waveguide, a crosstalk occurs in transmission through the optical waveguide. The waveguide is provided on the outer surface of the battery pack and does not require precise alignment, thereby reducing a complicated procedure of wiring.

The crosstalking signals are then derived from the one end of the optical waveguide and transferred to the light-receiving unit.

Figure 7:
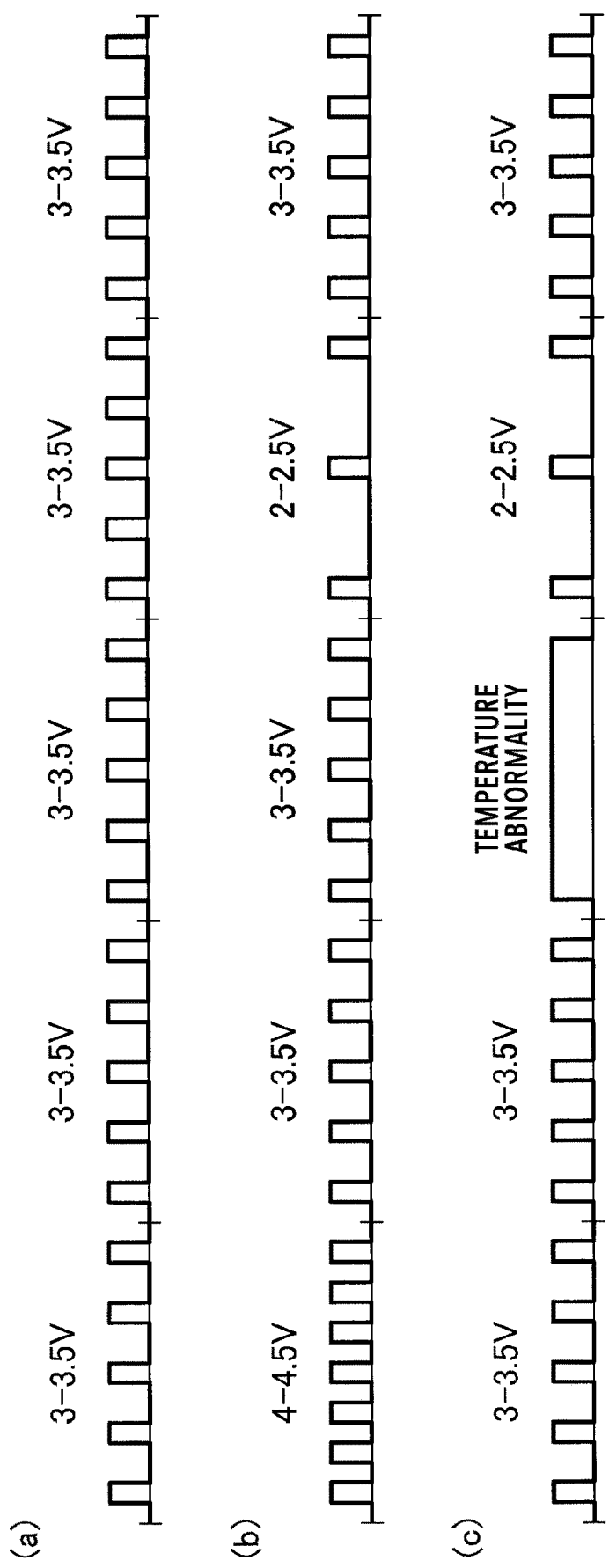
FIG. 7 (a), FIG. 7 (b), and FIG. 7 (c) are schematic diagrams showing examples of optical signal patterns derived from an optical waveguide.

FIG. 7 (a), FIG. 7 (b), and FIG. 7 (c) are schematic diagrams showing examples of the optical signal patterns derived from the optical waveguide.

In FIG. 7 (a), all optical signal patterns separated at every 100 s correspond to 3 to 3.5 V voltage, which shows that the voltages of all the cells are within the range of 3 to 3.5 V.

In FIG. 7 (b), optical signal patterns separated at every 100 s include one optical signal pattern corresponding to 2 to 2.5 V voltage, three optical signal patterns corresponding to 3 to 3.5 V voltage, and one optical signal pattern corresponding to 4 to 4.5 V voltage, which shows that there are variations in voltages of the cells. A cell with a too low voltage has a possibility of a short circuit and a cell with a too high voltage has a possibility of overcharging.

In FIG. 7 (c), optical signal patterns separated at every 100 s include four optical signal patterns corresponding to 3 to 3.5 V voltage and one optical signal pattern corresponding to temperature abnormality, which shows that temperature abnormality occurs in one cell.

Since a cell with temperature abnormality has a possibility of starting thermal runaway, it is necessary to consider replacement.

The optical signal patterns shown in FIG. 7 (b) and FIG. 7 (c) indicate that some of the five cells have a possibility of malfunction. Monitoring the conditions (voltage and temperature) of the cells continuously makes it possible to determine that a malfunction has occurred in the internal condition of the battery pack in a case where an optical signal pattern corresponding to a cell in which a rapid voltage drop or rise has occurred is seen or an optical signal pattern corresponding to a cell in which thermal abnormality has occurred is seen.

The light-receiving unit receives these optical signal patterns and converts them into electrical signals (pulse signals). The battery condition analyzer reads the electrical signals and obtains information on the voltages or temperatures of the cells. As a result, information on how many cells at what volts are present in total in the battery pack and information on how many cells have temperature abnormality in total can be obtained.

In the analysis of these optical signal patterns, changing an optical signal pattern corresponding to cell characteristics (voltage, temperature, etc.) for each cell makes it possible to determine which cell corresponds to which optical signal pattern. Thus, the presence of a malfunctioning cell can be confirmed.

Further, even in a case where it is impossible to determine which cell corresponds to which optical signal pattern, the presence of a malfunctioning cell can be confirmed. Thus, a malfunction in the battery pack can be detected without any problems.

Further, since there is no need to provide a light-receiving unit or battery condition analyzer for processing measurement information for each cell, the configuration can be simplified.

Further, an interval for obtaining cell information can be arbitrarily set. FIG. 7 (*a*), FIG. 7 (*b*), and FIG. 7 (*c*) show optical signal patterns of an area of 500 s constituted of five areas of 100 s each corresponding to one cell. Although the patterns are shown here without any gap for every 100 s, there may be an area with no optical signal pattern information between an optical signal pattern of a cell and an optical signal pattern of a different cell.

Further, in a time longer than a time obtained by multiplying a predetermined time of a pulse pattern per cell by the number of stacked cells, what optical signal patterns are obtained can be checked to know the condition of each cell included in the battery pack (how many cells at what volts are present in total in the battery pack and how many cells have temperature abnormality in total).

In the lithium ion battery module of the present embodiment, the form of accommodating the optical waveguide in the exterior body is not limited to the form shown in FIG. 3 and may be a different form. Different forms of accommodating the optical waveguide in the exterior body will be hereinafter described.

Figure 8:
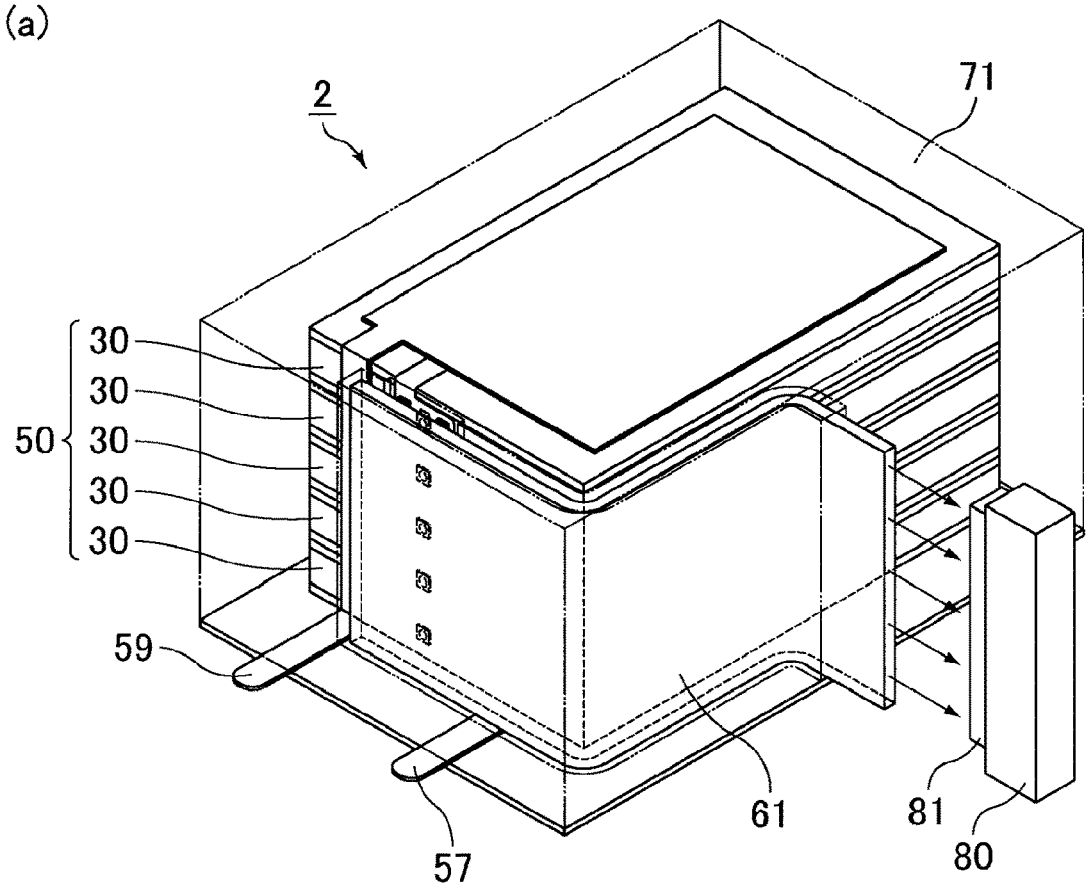
FIG. 8 (a) is a partially cutaway perspective view schematically showing another example of the lithium ion battery module and FIG. 8 (b) is a top cross-sectional view schematically showing the cross section of the lithium ion battery module shown in FIG. 8 (a) seen from the top.
Figure 8:
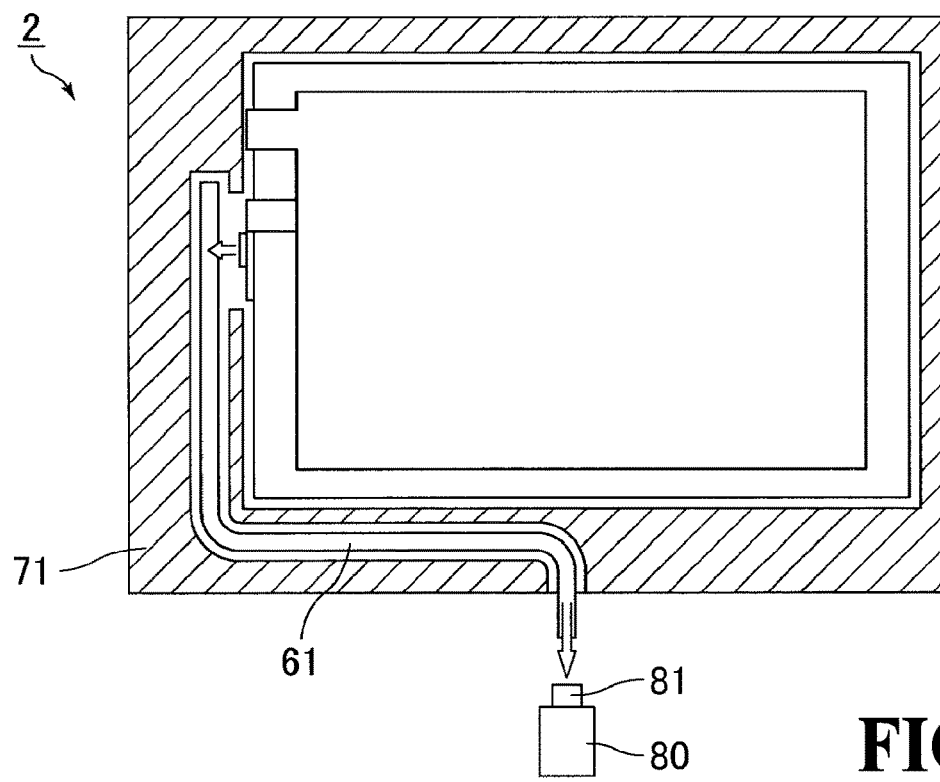

FIG. 8 (*a*) is a partially cutaway perspective view schematically showing another example of the lithium ion battery module and FIG. 8 (*b*) is a top cross-sectional view schematically showing the cross section of the lithium ion battery module shown in FIG. 8 (*a*) seen from the top.

In a lithium ion battery module 2 shown in FIG. 8 (*a*) and FIG. 8 (*b*), the exterior body 71 is provided with a path in which the optical waveguide 61 is accommodated. The optical waveguide 61 receives light on a side surface of the exterior body 71 facing the light-emitting unit of each cell unit 30 and is drawn out of the exterior body 71 from a different side surface of the exterior body 71.

The light-receiving unit 80 is disposed at a position where the optical waveguide 61 is drawn out of the exterior body 71 such that the light-receiving unit 80 receives an optical signal derived from one end of the optical waveguide 61 drawn out of the exterior body 71.

Since this structure elongates the path from the position where the optical waveguide receives light to the position where the optical waveguide is drawn out of the exterior body, water is prevented from entering the battery pack from the position where the optical waveguide is drawn out of the exterior body.

Figure 9:
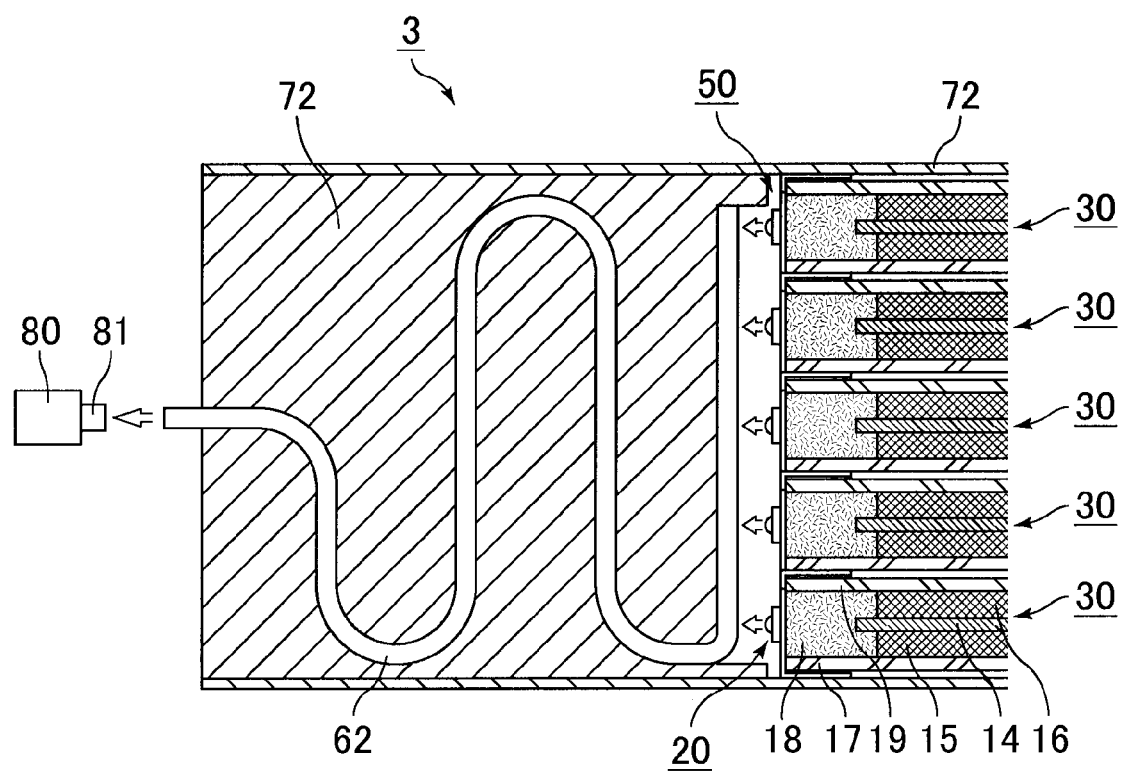
FIG. 9 is a side cross-sectional view schematically showing yet another example of the lithium ion battery module.

FIG. 9 is a side cross-sectional view schematically showing yet another example of the lithium ion battery module.

In a lithium ion battery module 3 shown in FIG. 9, the exterior body 72 has a labyrinth-like structure to elongate the path of the optical waveguide 62 in the width and thickness directions of the exterior body. The optical waveguide 626 receives light on a side surface facing the light-emitting unit of each cell unit 30, extends through the labyrinth-like structure, and is drawn from a side surface of the exterior body 72.

The light-receiving unit 80 is disposed at the position where the optical waveguide 62 is drawn out of the exterior body 72 such that the light-receiving unit 80 receives an optical signal derived from one end of the optical waveguide 62 drawn out of the exterior body 72.

Since this structure also elongates the path from the position where the optical waveguide receives light to the position where the optical waveguide is drawn out of the exterior body, water is prevented from entering the battery pack from the position where the optical waveguide is drawn out of the exterior body.

Figure 10:
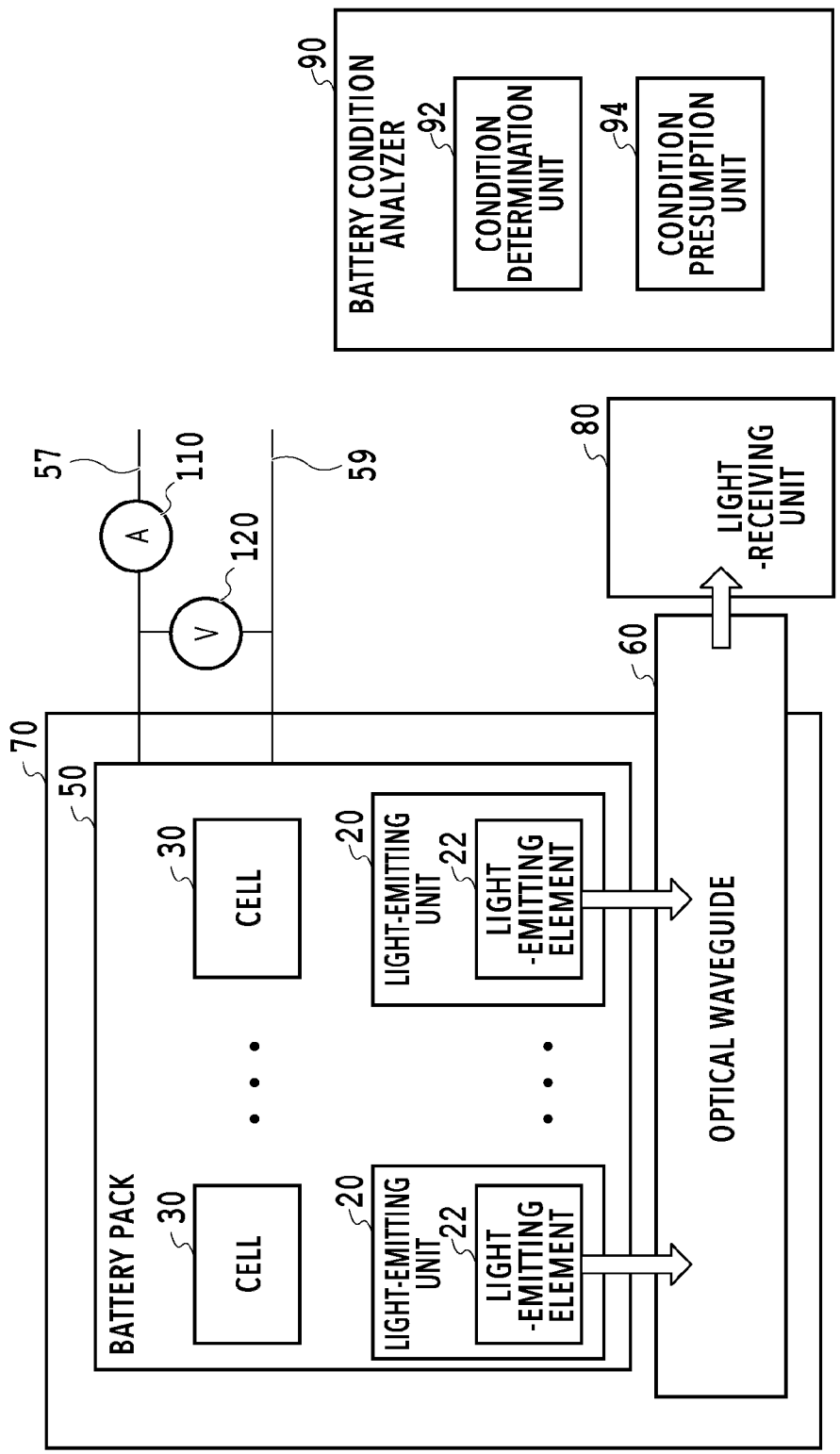
FIG. 10 is a functional block diagram of the lithium ion battery module.

FIG. 10 is a functional block diagram of the lithium ion battery module. The functional block of the lithium ion battery module 1 will be described with reference to FIG. 10. The same functional block can also be used for the lithium ion battery module 2 or 3. The lithium ion battery module 1 comprises the battery condition analyzer 90 configured to determine or presume the conditions of the cells in consideration of additional information different from electrical signals obtained by the light-receiving units 80 reversely converting optical signals.

As shown in FIG. 10, the lithium ion battery module 1 comprises a voltmeter 120 connected to the extracted wiring 57 and extracted wiring 59 to measure input and output voltages of the battery pack. The lithium ion battery module 1 also comprises an ammeter 110 connected to the extracted wiring 57 to measure input and output currents of the battery pack. Input and output voltage information obtained from the voltmeter 120 and input and output current information obtained from the ammeter 110 can be used as additional information to determine or presume the conditions of the cells 10. Further, a time series or prior knowledge can also be used to determine or presume the conditions of the cells. The time series can be an information table recording conditions determined by a condition determination unit 92 in chronological order. The prior knowledge can be an information table indicating the correspondence relationship between preset cell characteristics (internal conditions such as voltage and temperature) and characteristic signals output by the control elements 23*a* and 23*b* connected to the measuring terminals 24 and 25 and temperature measuring terminal (not shown), or information indicating a state transition of cells characteristics (internal conditions such as voltage and temperature). The time series and prior knowledge can be information recorded in a computer-readable record medium.

The battery condition analyzer 90 comprises the condition determination unit 92 and a condition presumption unit 94. The battery condition analyzer 90 may be a computing device comprising a memory, a processor, and a computer-readable storage medium recording a program that causes the processor to function as the condition determination unit 92 and the condition presumption unit 94. The computer-readable storage medium may record information indicating the prior knowledge described above in addition to the program.

FIG. 7 (*a*), FIG. 7 (*b*), and FIG. 7 (*c*) show examples of optical signal patterns in a case where optical signals introduced from five light-emitting units 20 into the optical waveguide 60 are derived from the light output portion of the optical waveguide 60 at such ideal transmission timings that light emission times of the five light-emitting units 20 do not overlap one another within a predetermined time. However, even at transmission timings shifted from the ideal transmission timings, optical signals transmitted from the light-emitting units 20 can be received by the light-receiving unit 80 and the characteristics of the cells corresponding to the light-emitting units 20 which have transmitted the optical signals can be correctly determined unless the signals overlap one another. Thus, the condition determination unit 92 first determines the conditions (characteristics) of the cells 10 based on electrical signals from the light-receiving unit 80. As to a cell whose condition cannot be determined, the condition presumption unit 94 presumes its condition. A specific example of a method of determining or presuming the voltage of a cell as the characteristics of the cell will be described below.

The condition determination unit 92 processes an electrical signal from the light-receiving unit 80 and determines whether the electrical signal is not a signal obtained by reversely converting two or more optical signals overlapping one another. For example, whether two or more optical signals have overlapped one another can be determined based on the number, width, and array pattern of pulses included in the electronic signal. In a case where it is determined that the electrical signal is not a signal obtained by converting two or more optical signals overlapping one another, the condition determination unit 92 determines a voltage indicated by the electrical signal as the voltage of the cell 10.

The condition presumption unit 94 presumes the voltage of a cell not determined by the condition determination unit 92. The condition presumption unit 94 uses the input and output voltage information obtained from the voltmeter 120. On the assumption that the input and output voltage information on the battery pack 50 formed by n cells 10 connected in series is Vtotal and the sum of the voltages of the cells is V1+V2+V3+ . . . Vn, the relationship of formula 1 is established. The condition presumption unit 94 uses the relationship of formula 1 to presume the voltage of a cell that cannot be determined by the condition determination unit 92.

$$V\text{total}=V1+V2+V3+\ldots Vn \quad \text{(formula 1)}$$

The condition presumption unit 94 can calculate a difference between Vtotal and the sum of the voltages of the cells determined by the condition determination unit 92 and presume the voltage of a cell not determined by the condition determination unit 92 based on the calculated difference. Here, the voltages of the cells determined by the condition determination unit 92 can include a quantization error at the time of quantization of voltage values by the control elements 23a and 23b connected to the measuring terminals 24 and 25 and temperature measuring terminal (not shown). Thus, it is preferable to presume the voltage of a cell not determined by the condition determination unit 92 in consideration of the range of the error. On the assumption that the number of cells whose voltages have been determined by the condition determination unit 92 is m (m is an integer), the lower limit of the range of voltage represented by the electrical signal is Sm, and the upper limit thereof is SM, the range Vrng_ND of voltage of a cell not determined by the condition determination unit 92 can be represented by formula (2). The condition presumption unit 94 can presume the voltage of a cell not determined by the condition determination unit 92 within the range.

$$V\text{total}-(SM1+SM2+\ldots SMm)<V\text{rng\_ND}<V\text{total}-(Sm1+Sm2+\ldots Smm) \quad \text{(formula 2)}$$

The condition presumption unit 94 can also presume the voltage of a cell not determined by the condition determination unit 92 at a certain timing based on the time series. For example, the condition presumption unit 94 can presume the voltage of a cell not determined by the condition determination unit 92 at a certain timing based on the voltage of a cell determined by the condition determination unit 92 at at least one of timings before and after the certain timing. For example, it is assumed that the voltages of cells determined by the condition determination unit 92 at t=t0 and t=t2 (t0<t2) are both equal to v1. In this case, based on the time series, the condition presumption unit 94 can presume that the voltage of a cell not determined by the condition determination unit 92 at t=t1 (t0<t1<t2) is any one of v0, v1, and v2 (v0<v1<v2) close to v1 (little different from v1). As another example, it is assumed that the voltage of a cell determined by the condition determination unit 92 at t=t0 is v1 and the voltage of a cell determined by the condition determination unit 92 at t=t2 is v3. In this case, based on the time series, the condition presumption unit 94 can presume that the voltage of a cell not determined by the condition determination unit 92 at t=t1 is v1, v2, or v3 (v1<v2<v3) between v1 and v3 close to v1 or v3 (little different from v1 or v3).

Further, the condition presumption unit 94 can also use the prior knowledge to presume the voltage of a cell not determined by the condition determination unit 92 at a certain timing. As the prior knowledge, a previously-measured voltage-capacity curve can be stored such that the condition presumption unit 94 can use a value fitting the voltage-capacity curve to presume a voltage change amount or voltage in a cell after the cell at a certain voltage is recharged in a predetermined amount.

The condition presumption unit 94 can presume the voltage of a cell not determined by the condition determination unit 92 at a timing by one or more of the presumption using the additional information, the presumption based on the time series, and the presumption using the prior knowledge.

As described above, the conditions of cells can be presumed even in a case where optical signals transmitted from the light-emitting units at transmission timings shifted from the ideal transmission timings are received by the light-receiving unit 80 while overlapping one another on the optical waveguide 60.

In the above description of the embodiment, the lithium ion battery has been shown as an example of a secondary battery forming a cell. However, the present invention is not limited to the configuration using the lithium ion battery as a cell and can also be implemented by using a different kind of secondary battery. For example, a lithium metal battery, a sodium ion battery, or a solid state battery may be used as the secondary battery forming a cell.

The cell can be formed using a secondary battery comprising a stacked unit and an electrolyte, the stacked unit comprising a set of a positive material, a negative material, and an ion-permeable material or ion-conductive material separating the positive material and the negative material.

As the positive material, one formed by combining a multiple oxide of lithium or sodium and transition metal with the positive current collector as described above can be used.

As the negative material, one formed by combining the negative active material for a well-known lithium ion battery or a well-known sodium ion battery described above with the negative current collector as described above can be used. The negative current collector can be formed by using a carbon-based current controller or a current controller formed by using lithium metal or titanium oxide.

As the ion-permeable material or ion-conductive material separating the positive material and the negative material, a solid state electrolyte can be used besides the separator as described above.

As the electrolyte, the above-described well-known or other well-known electrolyte solution or electrolyte can be used.

The large secondary battery module according to the embodiment described above comprises: a battery pack formed by stacking a plurality of cells, each of the cells including a stacked unit and an electrolyte, the stacked unit having a set of a positive material, an ion-permeable material or ion-conductive material, and a negative material which are stacked sequentially; a measuring unit and a light-emitting unit provided in each of the cell, the measuring unit being configured to measure characteristics of the cell, the light-emitting unit being configured to emit light and output an optical signal based on the characteristics of the cell; and an optical waveguide disposed to extend over the cells in the stacking direction and cover light-emitting surfaces of the light-emitting units provided in the battery pack, wherein the optical waveguide is a waveguide tube into which the optical signals are introduced and has a common optical path portion through which the optical signals are propagated from the light-emitting units.

In the case of using conventional optical fibers, since wiring connection is necessary, there is a problem that a wiring procedure is complicated. However, in the case of using the optical waveguide of the present disclosure, the problem of the complicated wiring procedure is solved because wiring connection is unnecessary.

Further, since the optical waveguide is disposed to cover the light-emitting surfaces of the light-emitting units provided in the battery pack, optical signals from the light-emitting units can be introduced into the optical waveguide without the need for precise alignment.

Further, since the optical waveguide has the common optical path portion through which optical signals are propagated from the light-emitting units, the optical signals can be propagated while simplifying the configuration as compared with the configuration of propagating optical signals through different optical paths.

Further, in the large secondary battery module according to the embodiment described above, the optical waveguide may comprise a light reflection portion which introduces outgoing light from the light-emitting units and reflects it therein to change its traveling direction and an extended portion extended from a portion adjacent or close to the battery pack to a portion away from the battery pack. The optical signals introduced from the light-emitting units into the optical waveguide may be propagated in a crosstalking state through a portion between the light reflection portion and the extended portion.

The optical waveguide comprising the above light reflection portion and extended portion can introduce optical signals from the light-emitting units through one end and output them to the outside of the battery pack through the other end. Further, since the optical waveguide comprising the above configuration is used to output optical signals in a crosstalking state from the light-emitting units to the outside of the battery pack, the configuration can be simplified as compared with the configuration of separately outputting optical signals from the light-emitting units to the outside of the battery pack.

Further, in the large secondary battery module according to the embodiment described above, the dimension of the optical waveguide in the width direction, which is a direction along the side of the cell on which the light-emitting unit is provided, may be larger than the largest dimension of the light-emitting surface of the light-emitting unit.

The use of the optical waveguide having the above dimension in the width direction provides a width sufficient for introducing optical signals from the light-emitting units into the optical waveguide. Thus, the maximum permissible misalignment can be increased as compared with the configuration requiring precise alignment such as optical fibers.

Further, in the large secondary battery module according to the embodiment described above, the optical waveguide may have a reflective finish, whereby outgoing light from the light-emitting units introduced into the optical waveguide is reflected toward the extended portion.

By the reflective finish put on the optical waveguide, outgoing light from the light-emitting units introduced through one end can be easily guided toward the other end.

Further, the large secondary battery module according to the embodiment described above may comprise an exterior body accommodating the battery pack and at least a part of the optical waveguide and a light-receiving unit disposed away from the battery pack inside or outside of the exterior body, the light-receiving unit and the battery pack may be electrically insulated from each other, and the light-receiving unit may receive optical signals propagated in a crosstalking state through the optical waveguide.

Further, in the large secondary battery module according to the embodiment described above, the light-receiving unit may further comprise a signal processing unit configured to receive the optical signals, convert them into electrical signals, process the converted electrical signals, and determine or presume the condition of each of the cells.

INDUSTRIAL APPLICABILITY

The large secondary battery module according to the present disclosure can measure the characteristics of the cells forming the battery pack and know the condition of each of the cells included in the battery pack (how many cells at what volts are present in total in the battery pack and how many cells have temperature abnormality in total).

Further, since the module has such a configuration that a portion which processes measurement data on the characteristics of the cells is not affected by the occurrence of a large current in the battery pack, the influence of a short circuit in the battery pack can be reduced.

REFERENCE SIGNS LIST 1, 2, 3 lithium ion battery module
10 cell
12 positive electrode
13 negative electrode
14 separator
15 positive active material layer
16 negative active material layer
17 positive current collector
18 frame member
19 negative current collector
20 light-emitting unit
21 wiring board
22 light-emitting element
23, 23a, 23b control element
24, 25 measuring terminal
30 cell unit
50 battery pack
57, 59 extracted wiring
60, 61, 62 optical waveguide
60a scattering finish
60b reflective finish
70, 71, 72 exterior body
80 light-receiving unit
81 light-receiving element
90 battery condition analyzer 92 condition determination unit
94 condition presumption unit
100 device body
110 ammeter
120 voltmeter

The invention claimed is:

1. A secondary battery module comprising:
a battery pack in which a plurality of cell units are connected, each of the cell units comprising a cell and a light-emitting unit, the cell including a stacked unit and an electrolyte, the stacked unit having a set of a positive material, an ion-permeable material or ion-conductive material, and a negative material which are stacked sequentially, the light-emitting unit being configured to measure characteristics of the cell and generate an optical signal according to the characteristics; and
an optical waveguide which is provided on an outer surface of the battery pack and into which an optical signal is introduced from the light-emitting unit of each of the cell units,
wherein the number of optical waveguides is less than the number of optical signals, and the optical waveguide provides a common optical path through which optical signals are propagated from the light-emitting units provided in the battery pack, and
the light-emitting unit comprises:
a measuring terminal configured to detect characteristics of the cell;
a control element configured to generate a control signal concerning an optical signal pattern of the optical signal based on information indicating the detected characteristics of the cell; and
a light-emitting element configured to emit light in the optical signal pattern and generate the optical signal based on the control signal.

2. The secondary battery module according to claim 1, wherein
optical signals are propagated from twenty or more light-emitting units provided in the battery pack through the common optical path.

3. The secondary battery module according to claim 1, wherein
the light-emitting unit comprises:
(a) a light-emitting element with a center wavelength from 700 to 800 nm;
(b) a light-emitting element with a center wavelength from 850 to 950 nm;
(c) a light-emitting element with a center wavelength from 1000 to 1400 nm;
(d) (a) and (b); or
(e) (b) and (c).

4. The secondary battery module according to claim 2, wherein
the light-emitting unit comprises:
(a) a light-emitting element with a center wavelength from 700 to 800 nm;
(b) a light-emitting element with a center wavelength from 850 to 950 nm;
(c) a light-emitting element with a center wavelength from 1000 to 1400 nm;
(d) (a) and (b); or
(e) (b) and (c).

* * * * *